United States Patent
Tu et al.

(10) Patent No.: US 7,558,413 B2
(45) Date of Patent: Jul. 7, 2009

(54) METHOD FOR DETECTING POLYPS IN A THREE DIMENSIONAL IMAGE VOLUME

(75) Inventors: Zhuowen Tu, San Diego, CA (US); Xiang Zhou, Exton, PA (US); Adrian Barbu, Plainsboro, NJ (US); Luca Bogoni, Philadelphia, PA (US); Dorin Comaniciu, Princeton Jct., NJ (US)

(73) Assignee: Siemens Medical Solutions USA, Inc,, Malvern, PA (US)

( * ) Notice: Subject to any disclaimer, the term of this patent is extended or adjusted under 35 U.S.C. 154(b) by 650 days.

(21) Appl. No.: 11/244,798

(22) Filed: Oct. 6, 2005

(65) Prior Publication Data

US 2006/0079761 A1    Apr. 13, 2006

Related U.S. Application Data

(60) Provisional application No. 60/617,879, filed on Oct. 12, 2004.

(51) Int. Cl.
*G06K 9/00* (2006.01)
(52) U.S. Cl. ............... 382/128; 382/131; 382/209; 382/216
(58) Field of Classification Search ............ 382/128, 382/131, 154, 209, 216
See application file for complete search history.

(56) References Cited

U.S. PATENT DOCUMENTS

| | | | |
|---|---|---|---|
| 5,220,640 A | 6/1993 | Frank et al. | |
| 6,546,379 B1 | 4/2003 | Hong et al. | |
| 2002/0102024 A1* | 8/2002 | Jones et al. | 382/225 |
| 2003/0103664 A1* | 6/2003 | Wei et al. | 382/131 |
| 2005/0047636 A1* | 3/2005 | Gines et al. | 382/131 |

OTHER PUBLICATIONS

Yoshida H. et al., "Three-Dimensional Computer-Aided Diagnosis Scheme for Detection of Colonic Polyps," *IEEE Trans. on Medical Imaging*, (2001) vol. 20:12 pp. 1261-1274 XP002374202.

(Continued)

*Primary Examiner*—Vikkram Bali
*Assistant Examiner*—Daniel Zeilberger

(57) ABSTRACT

A method for detecting target objects in a three dimensional (3D) image volume of an anatomical structure is disclosed. A set of candidate locations in the image volume are obtained. For each candidate location, sub-volumes of at least two different scales are cropped out. Each sub-volume comprises a plurality of voxels. For each of the sub-volumes, each sub-volume is rotated in at least two different orientations. A shape classifier is applied to each sub-volume. If the voxels in the sub-volume pass the shape classifier, a gradient direction is computed for the voxels. If the gradient direction for the voxels is one of a predefined orientation, a probability classifier is applied to the voxels. A probability measure computed by the probability classifier as a confidence measure is used for the sub-volume. If the confidence measure is above a predetermined threshold value, the sub-volume is determined to contain the target object.

21 Claims, 14 Drawing Sheets

OTHER PUBLICATIONS

Grossmann, E. "AdaTree: Boosting a Weak Classifier into a Decision Tree," *IEEE Computer Society Conference on Computer Vision and Pattern Recognition Workshops*, (2004) pp. 105-105 XP010761882.

Lienhart, R. "Empirical Analysis of Detection Cascades of Boosted Classifiers for Rapid Object Detection," *DAGM*, (2003) pp. 297-304 XP002374203.

Paik, D. S., et al., "Surface Normal Overlap: A computer-aided detection algorithm with application to colonic polyps and lung nodules in helical CT," *IEEE Trans. on Medical Imaging*, (2004) pp. 661-675 XP002374204.

International Search Report.

* cited by examiner

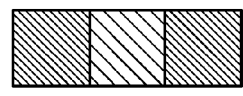
FIG. 7a
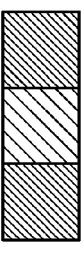
FIG. 7b
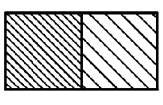
FIG. 7c
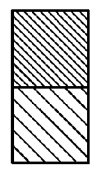
FIG. 7d
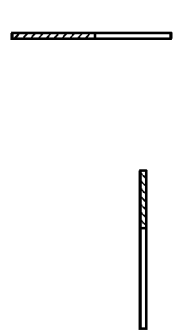
FIG. 7e
FIG. 7f
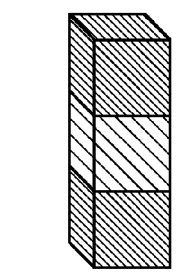
FIG. 7g
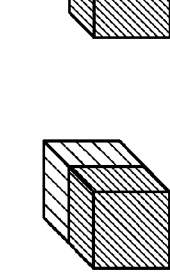
FIG. 7h
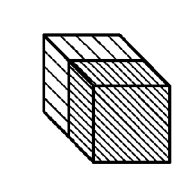
FIG. 7i
FIG. 7j
FIG. 7k
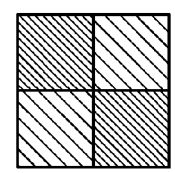
FIG. 7l
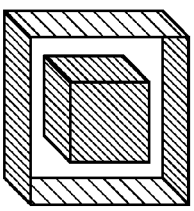
FIG. 7m
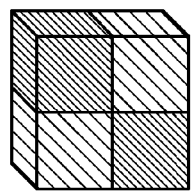
FIG. 7n
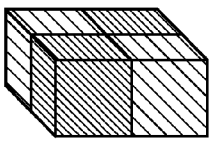
FIG. 7o
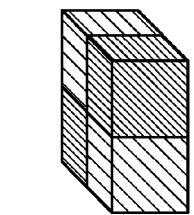
FIG. 7p
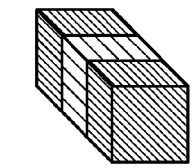
FIG. 7q
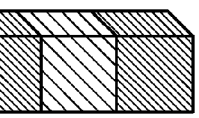

METHOD FOR DETECTING POLYPS IN A THREE DIMENSIONAL IMAGE VOLUME

CROSS REFERENCE TO RELATED APPLICATIONS

This application claims the benefit of U. S. Provisional Application Ser. No. 60/617,879, filed on Oct. 12, 2004, which is incorporated by reference in its entirety.

FIELD OF THE INVENTION

The present invention is directed to a method for detecting polyps in three dimensional image volume, and more specifically, to a method for automatically detecting polyps in three dimensional colon image volume by using a probabilistic approach.

BACKGROUND OF THE INVENTION

Colon cancer is one of the leading causes of death in the U.S. The number of deaths can be largely reduced if polyps can be detected and treated at their early stage of development. Virtual colonoscopy is a new technology being developed to help doctors find polyps in three dimensional (3D) computed tomography (CT) image data. However, it currently requires that the colon be physically cleansed prior to the CT scan. This is very inconvenient and prevents virtual colonoscopy from being a general screening tool for a large population. In addition, years of training are required for a doctor to successfully identify polyps in the 3D CT image.

The size of a polyp is measured by its diameter. Usually, a polyp smaller than 6 mm is not of much clinical significance. Polyps bigger than 9 mm are very likely to be cancers and can be identified by doctors easily. It is most important for a polyp detection system to be able to detect polyps in the 6~9 mm range since they may develop into cancers.

The task of automatic polyp detection is very challenging. First, the CT data is taken without bowel cleansing in order to minimize the inconvenience to patients. Tagged materials, such as stool, though mostly depicted as bright areas in the image, are a big distraction. Second, polyps of interest are very small and don't have unique intensity patterns, nor have any special shapes. It is hard to distinguish them from the colon wall, especially when they are surrounded by tagged material. Third, the volumetric data to be processed is massive (e.g., 400×512×512), which eliminates the possibility of using any computationally expensive methods. There is a need for a method for detecting polyps in three dimensional colon image data by using a generative model to capture the underlying generation process of the polyp.

SUMMARY OF THE INVENTION

The present invention is directed to a method for detecting target objects in a three dimensional (3D) image volume of an anatomical structure. A set of candidate locations in the image volume are obtained. For each candidate location, sub-volumes of at least two different scales are cropped out. Each sub-volume comprises a plurality of voxels. For each of the sub-volumes, each sub-volume is rotated in at least two different orientations. A shape classifier is applied to each sub-volume. If the voxels in the sub-volume pass the shape classifier, a gradient direction is computed for the voxels. If the gradient direction for the voxels is one of a predefined orientation, a probability classifier is applied to the voxels. A probability measure computed by the probability classifier as a confidence measure is used for the sub-volume. If the confidence measure is above a predetermined threshold value, the sub-volume is determined to contain the target object.

BRIEF DESCRIPTION OF THE DRAWINGS

Preferred embodiments of the present invention will be described below in more detail, wherein like reference numerals indicate like elements, with reference to the accompanying drawings:

FIG. 7 illustrates examples of ID, 2D and 3D Haar wavelet filters in accordance with the present invention;

DETAILED DESCRIPTION

The present invention is directed to a method for detecting polyps in three dimensional (3D) colon image volume by using a learning based approach for pulmonary nodule detection in 3D volumes. A general generative model is defined to capture the underlying generation process of an object, such as a polyp. Integral volumes and 3D Haar filters are designed for fast computation of features. A cascade of Probabilistic Boosting Trees (PBT) is adopted to learn the classifiers. The present invention is capable of automatically selecting a thousand features from a pool of 50,000 candidate features. The present invention does not require pre-segmentation of the data, which is specifically useful in detecting polyps in uncleansed data, such as an uncleansed colon.

Figure 1A:
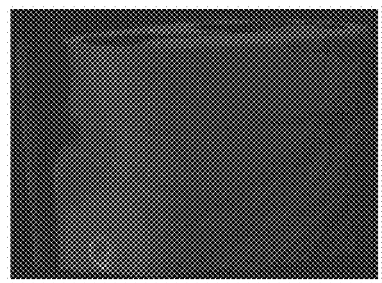
FIG. 1 illustrates different views of a 3D CT image of a colon.
Figure 1B:
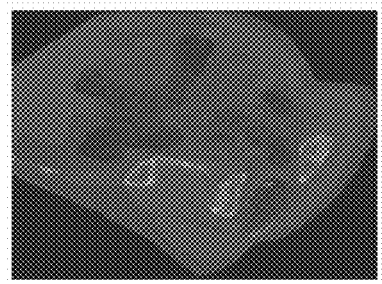
Figure 1C:
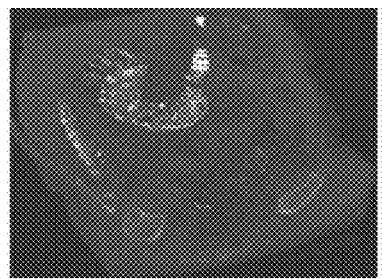

The 3D volume image data can be obtained using different imaging modalities such as Computed Tomography (CT), X-ray or Magnetic Resonance Imaging (MRI). FIG. 1 illustrates a number of views of a colon. The first image 102 shows a complete CT volume of a section of a colon. There are two types of objects inside a colon, air and stool. Though most of them appear to be either very dark (e.g., air) or very bright if successfully tagged, there are still a large portion of residual materials which have similar intensity values as normal tissue due to poor tagging. Residual materials (e.g., stool) are tagged to make them appear bright under CT and can be removed electronically. The middle image 104 shows a CT image of a physically cleansed colon. Image 106 shows a CT image of an uncleansed colon which has been tagged.

The present invention uses a detection method based on boosting and which uses ID, 2D and 3D features which are combined as candidate weak classifiers. Special features that directly account for the underlining regularity are incorporated. All the features have different costs and the present invention automatically takes into consideration the associated costs in determining the feature selection. The present invention pursues feature selection as multiple chains to explore ways of combining features so as to minimize overall error functions.

Figure 2:
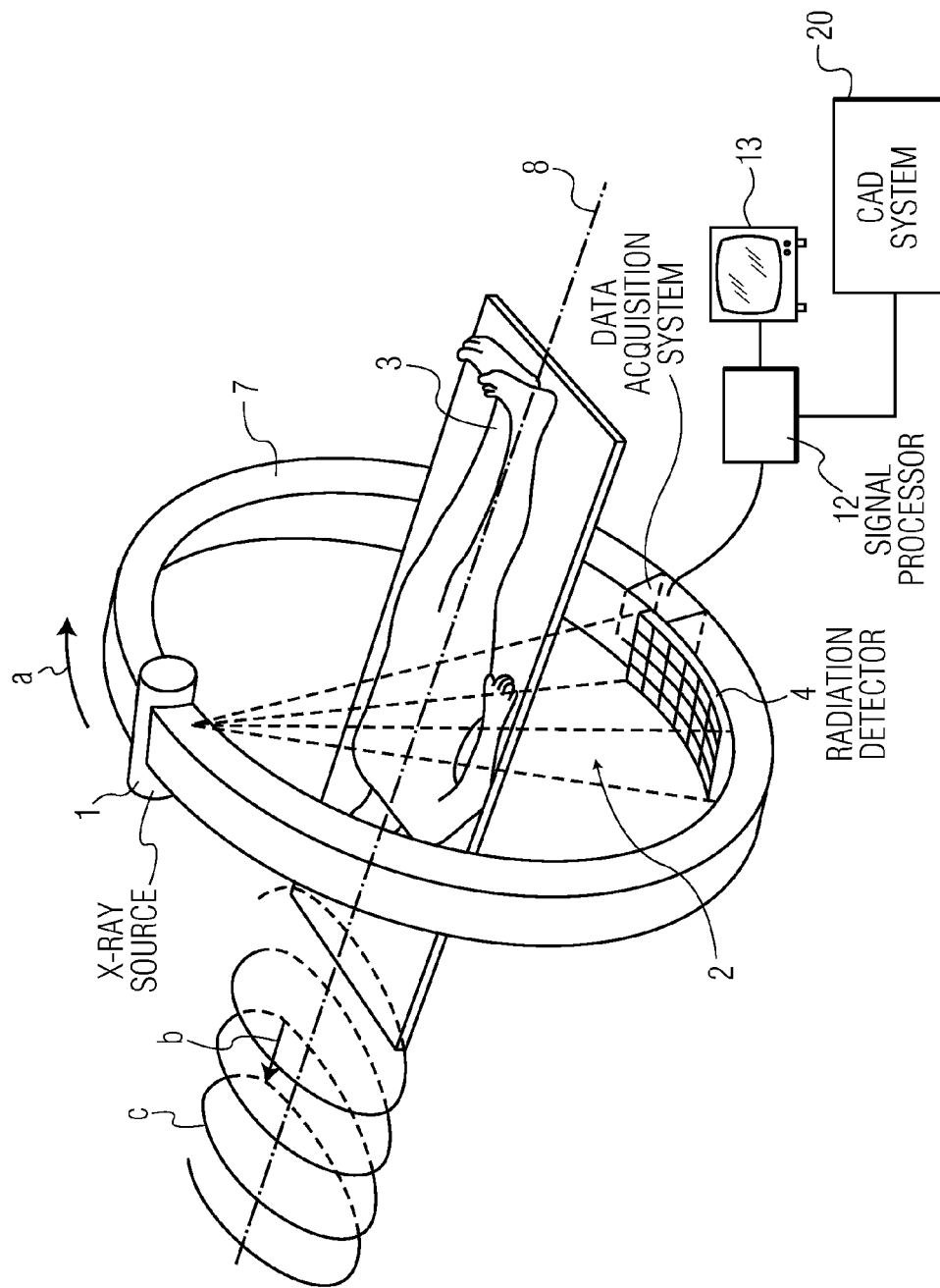
FIG. 2 is a schematic diagram of an exemplary Computed Tomography (CT) system in accordance with the present invention.
Figure 3F:
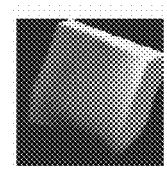
FIG. 3 illustrates 12 polyps out of 65 positive samples.
Figure 3L:
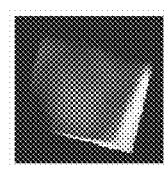
Figure 3E:
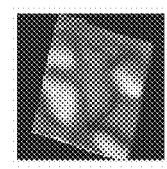
Figure 3K:
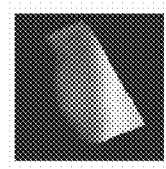
Figure 3D:
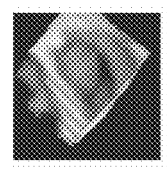
Figure 3J:
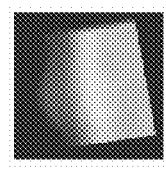
Figure 3C:
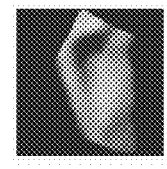
Figure 3I:
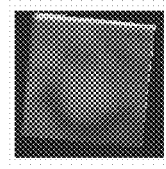
Figure 3B:
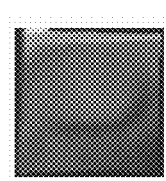
Figure 3H:
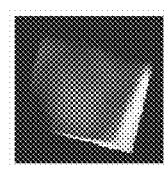
Figure 3A:
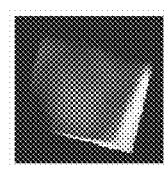
Figure 3G:
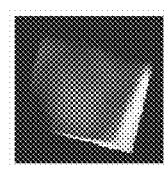

FIG. 2 schematically depicts an exemplary Computed Tomography (CT) system in accordance with the present invention. The CT system in conjunction with a Computed Aided Detection (CAD) system can be used to perform a non-invasive procedure on a patient to screen for various medical conditions. Examples of such procedures are virtual colonoscopies or chest screenings for the presence of lesions and possibly cancerous tissue. In addition, system can be used to detect lymph nodes and polyps in the lungs. It is to be understood by those skilled in the art that other imaging modalities can be used without departing from the scope and spirit of the present invention. For example, magnetic resonance imaging (MRI), fluoroscopy or ultrasound imaging could also be used to obtain the imagines. For purposes of explanation, the present invention will be described in the context of use of an exemplary Computed Tomography (CT) system. CT images of a colon are obtained which may then be segmented and used to detect polyps. However, as indicated above, the method of the present invention can also be used to detect polyps in lung nodules or lymph nodes.

The CT is equipped with an X-ray source 1, emitting a pyramidal X-ray beam 2, whose marginal rays are represented by the dot-dashed lines in FIG. 2 that penetrates an object 3 to be examined, for example, a patient, and that is incident on a radiation detector 4. The X-ray source 1 and the radiation detector 4 are, in the exemplary embodiment, mounted opposite to one another on an annular gantry 7.

The X-ray source 1 and the radiation detector 4 thus form a metrological system that can be rotated around the system axis 8 so that the patient 3 can be X-rayed at various projection angles relative to said system axis 8 and at various positions along the system axis 8. The resultant output signals of the individual detector elements are read out by a data acquisition system 10. The signals are sent to a signal processor 12 that computes an image of the patient 3 that, in turn, can be displayed on a monitor 13.

The images scanned by the CT system and computed by the signal processor 12 are transmitted to a CAD system 20 for further processing. The CAD system 20 tags the residual materials which may or may not be electronically removed. A learning based approach is used to detect polyps in the colon.

In accordance with the present invention, polyps are detected directly in the original data with tagged materials. FIG. 3 shows 12 polyps out of 65 positive samples. This approach is more challenging since the tagged materials provide a significant distraction. Though most polyps appear to have a bun shape, they are usually small and hard to distinguish, with folds, especially when surrounded by tagged materials. It is also feasible to use an intermediate approach in which stools that are very bright are removed and then detection procedures are employed to locate polyps.

Figure 4:
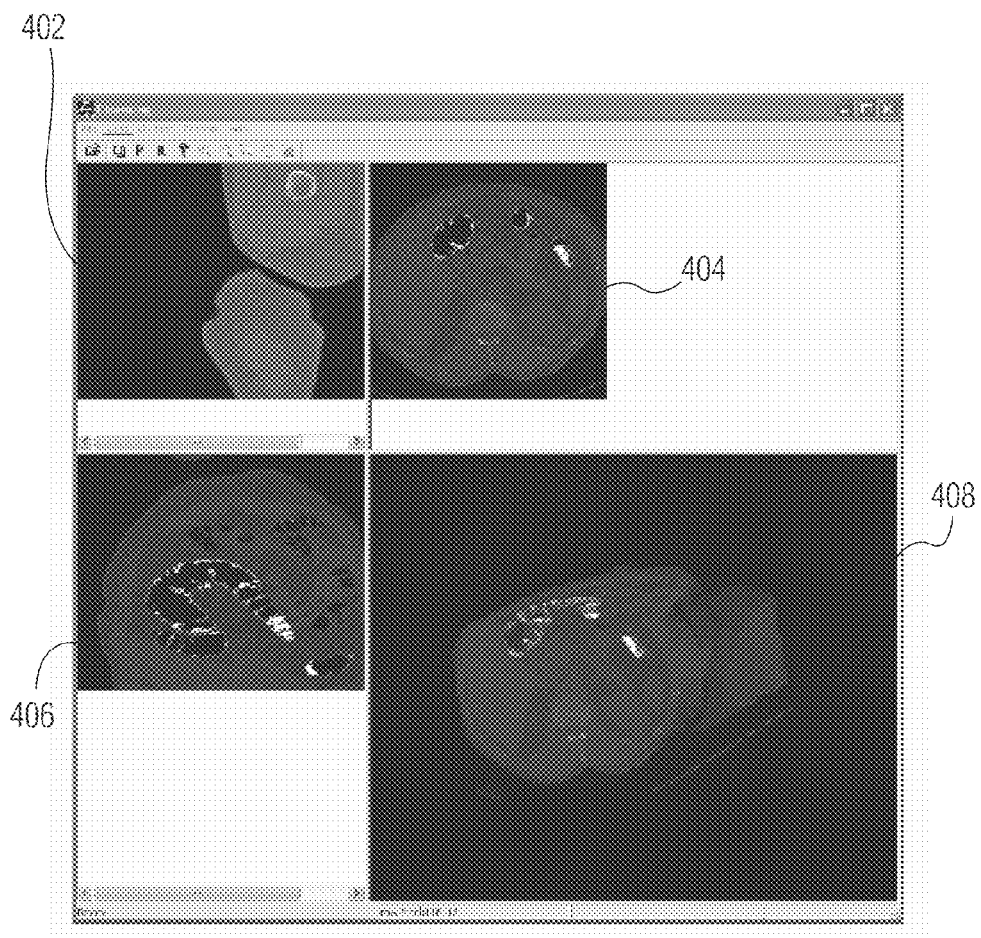
FIG. 4 illustrates a snap shot of an interface used to visualize and process 3D colon data in accordance with the present invention.

In accordance with the present invention, an interface based on OpenGL Volumizer is used to visualize and process the 3D colon data. However, it is to be understood by those skilled in the art that other interfaces can be used without departing from the scope and spirit of the present invention. FIG. 4 illustrates a snap shot of the interface. The window at the lower right 408 shows the 3D visualization of the whole volume. Users can rotate the volume and cut through to view different slices. The other three windows 402-406 display the slices at the XY, YZ and XZ planes.

Once the 3D image data of the colon is obtained, the images is scanned to look for objects in the image that have a high degree of curvature. These objects are collected as candidates to be analyzed to determine if the objects are polyps as will be described in more detail hereinafter. Next, classifiers are trained which are used to detect the polyps. Each 3D input image volume is assumed to be isotropic. Detection of polyps is difficult because of the large variations in shape of the polyps. For a small or medium sized polyp, it often observes a regular shape of a half hemisphere. When the polyp becomes larger, it starts to develop a variety of shapes due to interactions with the colon wall and other structures.

In addition, polyps appear in all possible orientations on the colon wall. A generative model is created to train the set of classifiers. A dictionary $\psi$ is defined where $\psi=(\Delta_1, \Delta_2, \ldots)$ and $\Delta_i$ is a 2D/3D template. Each object instance x is assumed to be generated by a transformation function T on $\psi$. A set of typical parameters in T, $\Theta=\{1, s, \theta, \Phi, \alpha\}$ can be 1—the number of templates used, s—scale, $\theta$—rotation, $\Phi$—deformation, and others which are represented by $\alpha$. If y is the label of x, then y=+1 when x is an object of interest (positive) and y=−1 when x is not an object of interest (negative). The probability of x can be modeled by a generative model as $$P(x \mid \Theta; y; \psi) = \frac{1}{Z}\exp\{-\|x - T(\Theta, \psi)\|\} \quad (1)$$

Where $\| \|$ defines a distance measure between x and T( ), and Z is the partition function $$Z = \sum_x \exp\{-\|x - T\|\}.$$

In a discriminative approach, a sample x is classified based on the posterior $$P(y|x) \quad (2)$$

In an alternative approach, parameters in $\Theta$ can be explicitly computed $$P(y \mid x) = \sum_{\theta_1} p(y \mid \Theta_1, x) p(\Theta_1 \mid x) \quad (3)$$

Figure 5A:
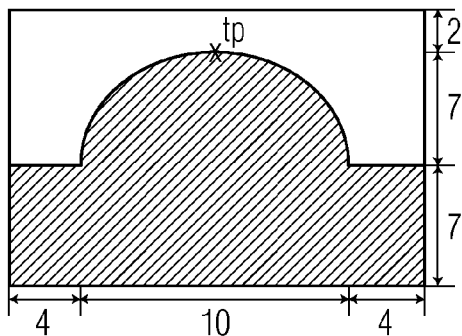
FIG. 5a-5c illustrates how candidate data is aligned in accordance with the present invention.
Figure 5B:
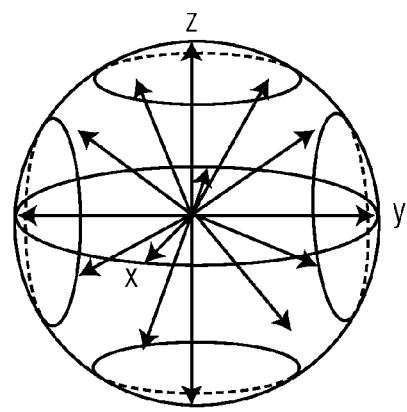
Figure 5C:
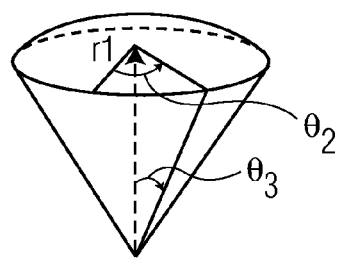
Figure 6A:
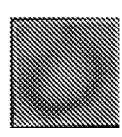
FIG. 6 illustrates a typical polyp and its augmented data in accordance with the present invention.
Figure 6B:
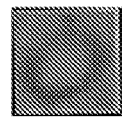
Figure 6C:
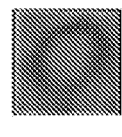
Figure 6D:
Figure 6E:
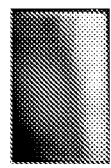
Figure 6F:
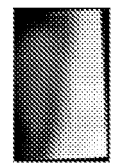
Figure 6G:
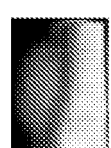
Figure 6H:
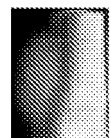
Figure 6I:
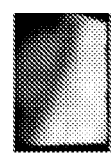
Figure 6J:
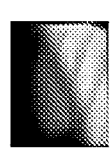
Figure 6K:
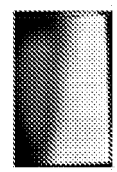
Figure 6L:
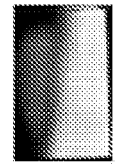

In accordance with eqn. (3), one objective is to reduce the complexity of the training samples. Parameters are chosen so that $\Theta_1=\{s,\theta,\alpha\}$ where s is the scale, $\theta$ is the orientation, and $\alpha$ is the aspect ratios of a polyp w.r.t. its depth, height, and width. A template of size 24×24×16 is created whose 2D view is shown in FIG. 5a. An orientation sphere is divided into 14 zones, 4 of which are along the major axes as shown in FIG. 5b. Each candidate object or polyp is aligned to the major orientation as shown in FIG. 5c.

In the orientation zone r1, the possible detailed orientations $(\theta_1, \theta_2)$ are sampled to augment the training data. As a result, specific values of $(\theta_1, \theta_2)$ don't need to be searched. In addition, the training samples are augmented from 130 to about 13,000 which reduce the chance of overfitting. FIG. 6 illustrates a typical polyp sample after alignment and its three dimensional augmented data.

In accordance with the present invention, a sub-volume based on a template of 24×24×16 is classified. Positive samples are aligned and augmented to one of the major directions with its tip. The features used for polyp detection should have a number of properties. The features should be scale and aspect ratio invariant to a certain degree. In order to accomplish this, different possible scales and aspect ratios are used in the detection phase as will be described in further detail hereinafter. The features should be fast and easy to compute. The features should be informative for the objects of interest.

In accordance with the present invention, an integral volume and 3D Haar filters are used for polyp detection. FIG. 7 illustrates ID, 2D and 3D Haar filters that are used in the present invention. At each location $(x_1, y_1, z_1)$, the integral volume is computed $$\int_{x1}\int_{y1}\int_{z1} V(x,y,z)\,dx\,dy\,dz.$$

The computational cost of computing Haar filters is largely reduced since only the sum of the values of the corners of the Haar filter in the integral volume need to be computed. Because the procedure of aligning data and training classifiers is time consuming, the features are preferably semi-rotation invariant. That is, once the classifier for one major direction r1 is trained, the classifiers for the other orientations are automatically derived. Haar filters meet this requirement for six major orientations as shown in FIG. 9. For the other eight orientations, the 3D data in the detection stage is rotated rather than having another set of classifiers for them. This reduces the training effort and the chance of overfitting since virtually there is only one classifier trained.

In accordance with the present invention, a probabilistic boosting tree (PBT) is used to explicitly compute the discriminative model. In the training stage, a tree is recursively constructed in which each tree node is a strong classifier. The input training set is divided into two sets, left and right ones, according to the learned classifier. Each of which is then used to train the left and right sub-trees recursively. Each level of the tree is an augmented variable. Clustering is intrinsically embedded in the learning state with clusters automatically discovered and formed in a hierarchical manner. PBT does training and testing in a divide-and-conquer manner and outputs the overall discriminative model as:

$$\tilde{p}(y|x) = \sum_{l_1} \tilde{p}(y|l_1, x) q(l_1|x) \qquad (4)$$
$$= \sum_{l_1, l_2} \tilde{p}(y|l_2, l_1, x) q(l_2|l_1, x) q(l_1|x)$$
$$= \sum_{l_1,\ldots,l_n} \tilde{p}(y|l_n, \ldots, l_1, x), \ldots, q(l_2|l_1, x) q(l_1|x)$$

Figure 8:
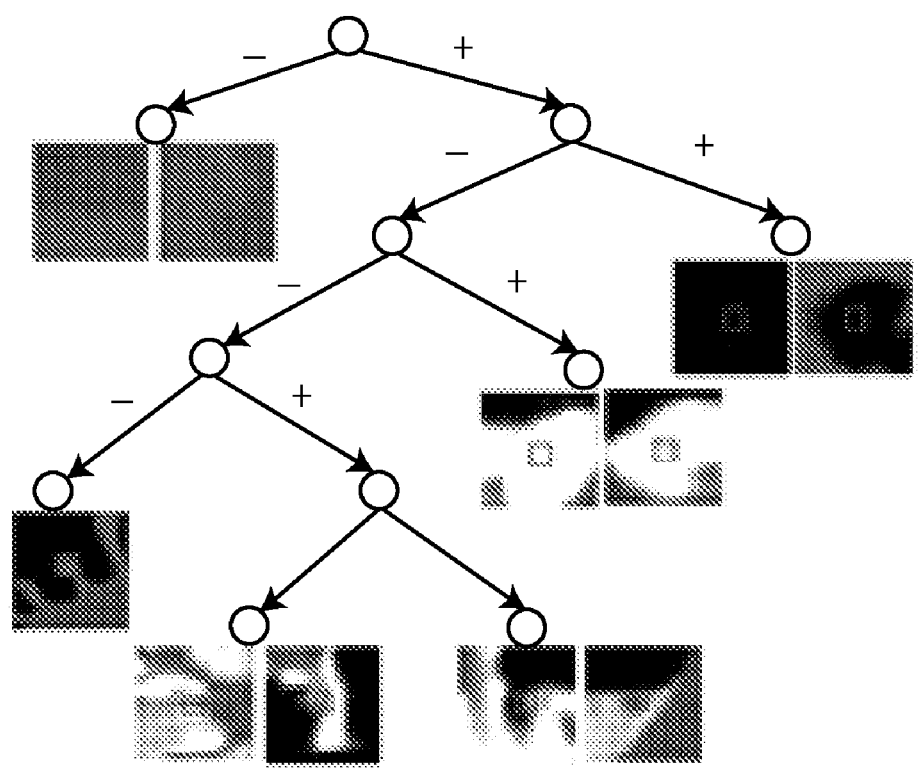
FIG. 8 illustrates a probability boosting tree in accordance with the present invention.
Figure 9A:
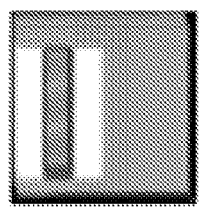
FIG. 9 illustrates one of the Haar wavelet filters of FIG. 7 rotated in accordance with six major orientations in accordance with the present invention.
Figure 9B:
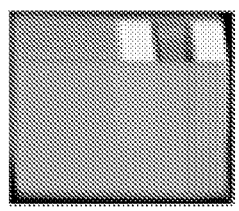
Figure 9C:
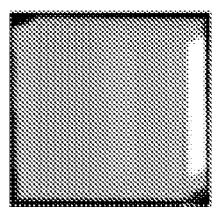
Figure 9D:
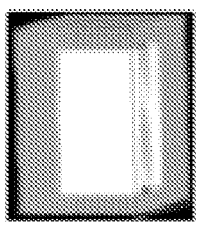
Figure 9E:
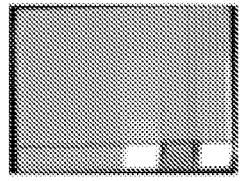
Figure 9F:
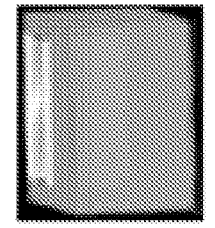
Figures 10A, 10B:
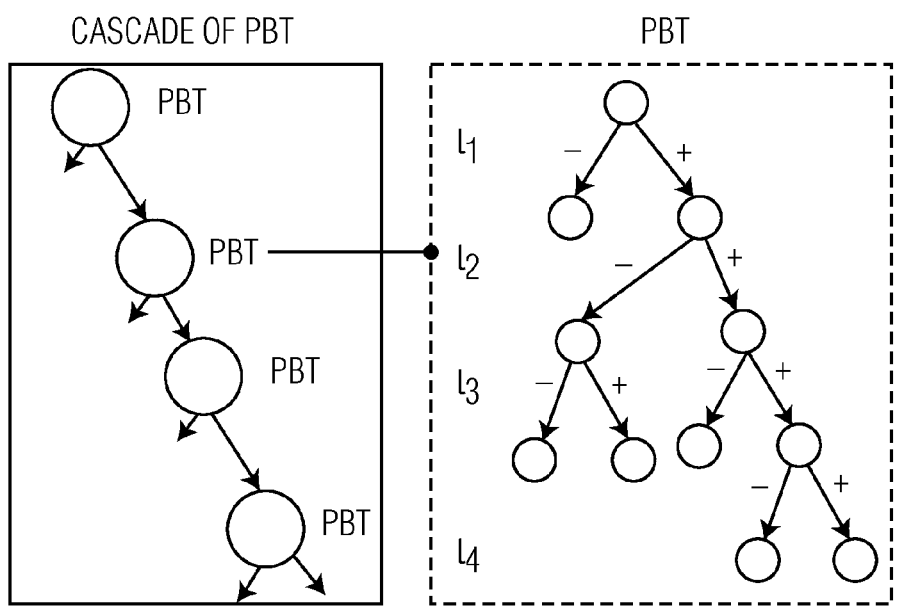
FIG. 10 illustrates a probability boosting tree and its cascade in accordance with the present invention.
Figure 11D:
FIG. 11 illustrates trained shape classifiers in accordance with the present invention.
Figure 11C:
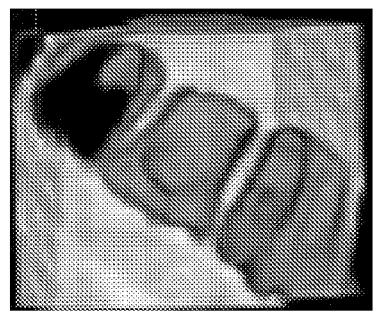
Figure 11B:
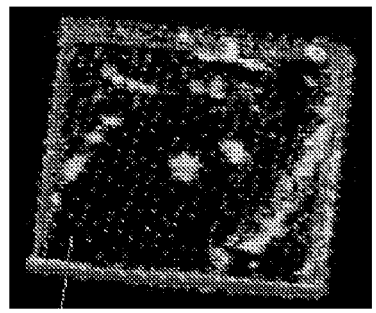
Figure 11A:
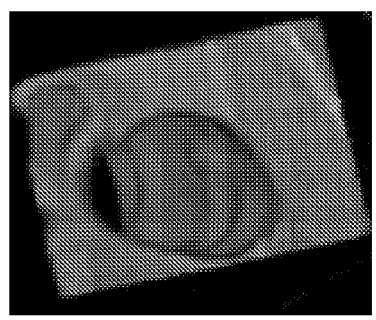

Examples of PBTs are shown in FIGS. 8 and 10. Each tree level $l_i$ is an augmented variable. To facilitate the process of bootstrapping and reduce the number of negatives for PBT, a cascade approach is used as shown in FIG. 10. Each stage of PBT has a probability as a threshold. Those whose $\tilde{p}(y|x)$ is bigger than the probability will pass into the next stage.

The following describes an example for training the polyp classifiers in accordance with the present invention. In the example, 80 volumes are used for training in which there are 130 polyps annotated and segmented by radiologists. First, an AdaBoost classifier is trained to classify whether a voxel is on the surface of a polyp or not. This classifier is used to quickly screen out a majority of the voxels that are on a flat surface. The features used are intensity, gradient, Gaussian curvatures, mean curvatures, etc. A general AdaBoost algorithm is trained to combine these features. Some of the results are illustrated in FIG. 11.

Second, a classifier is trained which comprises a cascade of PBT classifiers. Based on the segmentation of a polyp and its annotation on the tip, the bounding box for it can be precisely located. Training samples are aligned and augmented to 13,000 positives of size 24×24×16. In the 80 training volumes, those voxels whose gradient is along the major r1 orientation are randomly sampled and have passed the first basic shape classifier. Also, these voxels should not be on the surface of any annotated polyps. The 3D sub-volumes are then cropped out of size 24×24×16 aligning these voxels with the tip position in the template. There are in total 30,000 of these negative samples obtained. Using these positives and negatives, a PBT is trained with maximum 9 levels and 22 weak classifiers for each AdaBoost node.

Once a PBT is trained, it is used to run through the training volumes to perform bootstrapping to obtain more negatives. There are five PBT trained producing a cascade of five levels. Since each PBT computes the discriminative model $\tilde{p}(y|\Theta_1, x)$, the threshold can be easily adjusted to balance between detection rate and number of false positives. The first two levels are set to have nearly 100% detection rate. Each PBT comprises approximately 1,000 weak classifiers on the Haar filters. Based on the trained cascade of PBT, the other 5 cascades are obtained by rotating the Haar filters as illustrated in FIG. 9.

Figure 12:
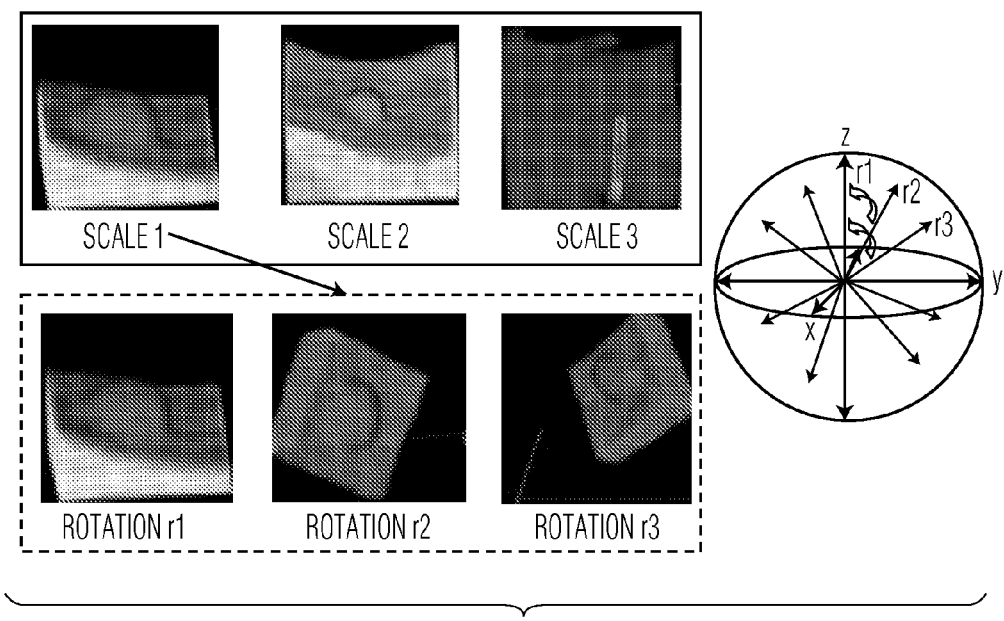
FIG. 12 illustrates a sub-volume shown at three different scales and three different orientations in accordance with the present invention.
Figure 13A:
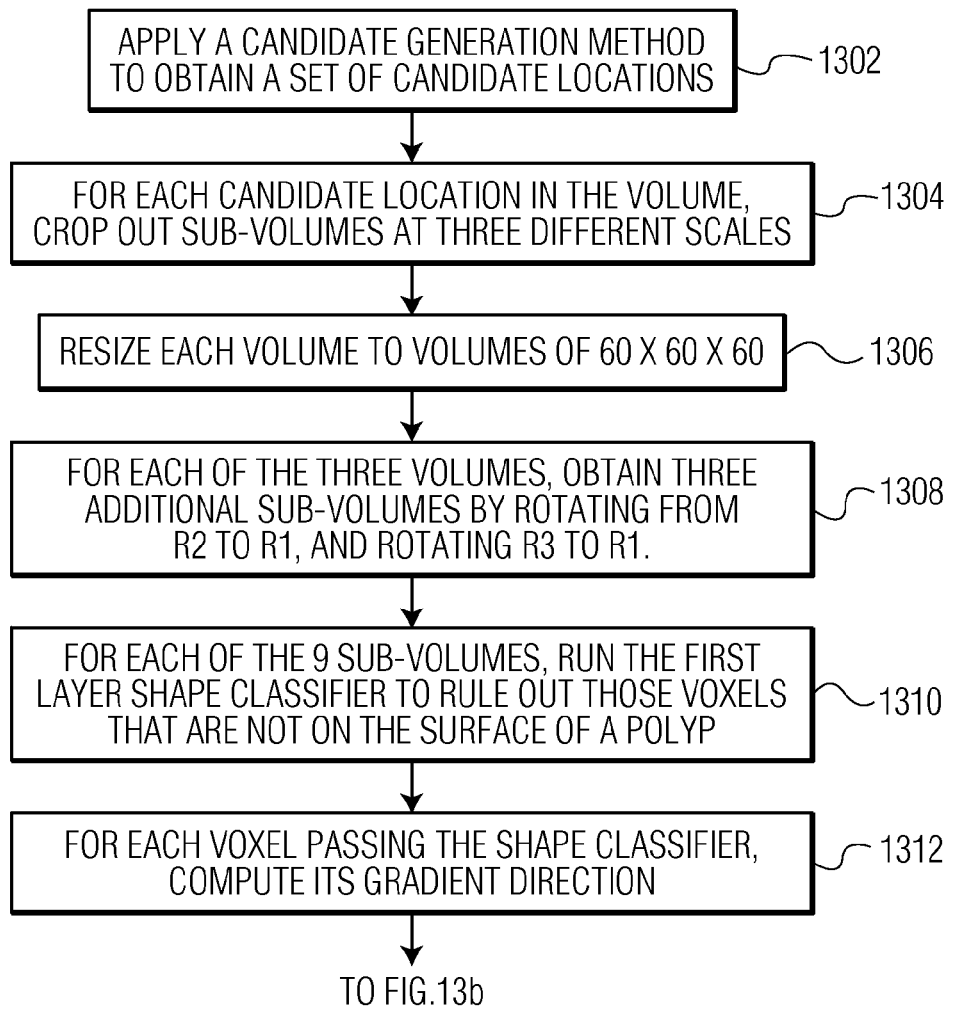
FIGS. 13a and 13b are a flow chart that illustrates a method for detecting polyps in accordance with the present invention.
Figure 13B:
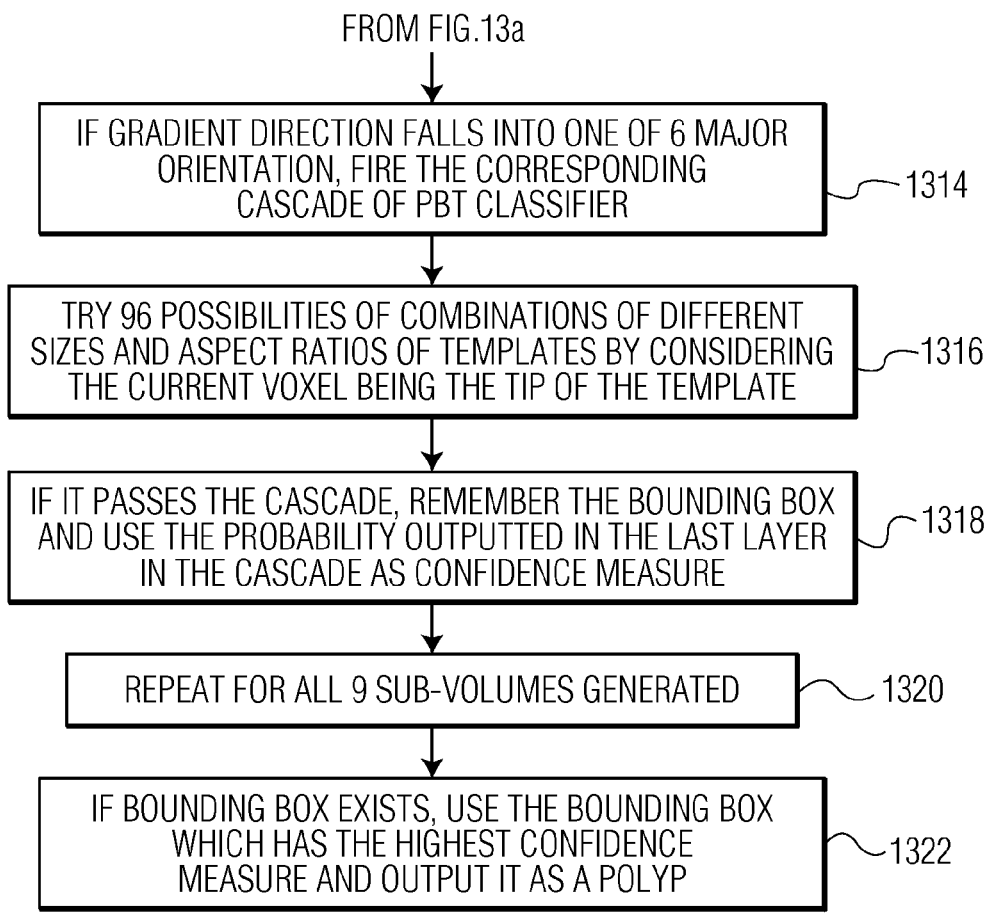

In accordance with the present invention, a method for detecting polyps will now be described with reference to FIGS. 12 and 13a-b. A candidate generation method is used too obtain a set of candidate locations (step 1302). An example of a candidate location is illustrated in FIG. 12. For each candidate location, 9 sub-volumes are created. The 9 sub-volumes comprise 3 volumes at different scales with each volume rotated in 3 orientations as illustrated in FIG. 12. The top row in FIG. 12 shows the sub-volumes at 3 different scales. This is done to cover the possibility of different sizes at a large scale. The bottom row shows 3 sub-volumes at different orientations. The figure to the right shows the definitions of r1, r2 and r3 and how the rotated volumes are obtained.

More specifically, for each candidate location in the volume, sub-volumes are cropped out at different scales (step 1304). For example, the sub-volume may be rescaled so that there is one sub-volume at half the original scale, one sub-volume at the original scale and a third sub-volume at one and a half times the original scale. It is to be understood by those skilled in the art that the three different scales used in the polyp detection method may differ based on clinical results and to reduce the likelihood of detecting false positives without departing from the scope and spirit of the present invention. The three sub-volumes are then resized to volumes of 60×60×60 (step 1306).

For each of the three sub-volumes, three additional sub-volumes are obtained at different orientations. Each sub-volume is rotated from direction r2 to direction r1. The sub-volumes are also rotated from direction r3 to r1 (step 1308). This results in the creation of 9 sub-volumes for each candidate location.

For each of the 9 sub-volumes, the first layer shape classifier is run to rule out those voxels that are not on the surface of a polyp (step 1310). For each voxel that passes the shape classifier, its gradient direction is computed (step 1312). If the gradient direction falls into one of the six major orientations, the corresponding cascade of PBT classifier is fired (step 1314). Next, 96 possibilities of combinations of different size and aspect ratios of templates are tried by considering the current voxel being the tip of the template (step 1316). The 96 possibilities correspond to 96 Haar filters which have been computed offline. It is to be understood that a different number of possibilities can be used to analyze the voxels without departing from the scope and spirit of the present invention.

If the voxel passes the cascade, the bounding box is remembered and its corresponding probability is outputted in the last layer of the cascade as a confidence measure (step 1318). This process is repeated for each of the 9 sub-volumes (step 1320). If bounding boxes exist after each of the sub-volumes has been analyzed, the bounding box having the highest confidence measure is used and the candidate is determined to be a polyp (step 1322).

More time is spent in the detection stage which results in the reduced complexity of the training samples. In addition, only one cascade of PBT for r1 is trained and used for all other directions. This helps to improve the generality of the detector and results in greater efficiency. It can be seen that features are much easier to obtain if samples are in the upper-right position than slanted. For each voxel in the sub-volume, a shape classifier is run as well as a cascade PBT at different scales and aspect ratios. The best bounding box is outputted if it is found to be a polyp.

Having described embodiments for a method for detecting polyps in three dimensional colon image data, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A method for detecting polyps in a three dimensional (3D) image volume of an anatomical structure comprising the steps of:
   receiving a three dimensional (3D) image volume of an anatomical structure;
   obtaining a set of candidate locations in the image volume;
   for each candidate location, crop out three sub-volumes, wherein each sub-volume comprises a different scale and a plurality of voxels;
   for each of the three sub-volumes, obtain two additional sub-volumes (for a total of nine sub-volumes) at different orientations by rotating each sub-volume in two different directions;
   for each of the nine sub-volumes, apply a shape classifier thereto;
   discard voxels of each of the nine sub-volumes that are not identified by the shape classifier as being on a surface of a polyp, and for each voxel of each of the nine sub-volumes that is identified by the shape classifier as being on the surface of a polyp, perform the following:
   (a) compute a gradient direction for the voxel;
   (b) if the gradient direction for the voxel falls into one of a plurality of orientations, apply a probability classifier cascade to the voxel;
   (c) if the voxel passes the probability classifier cascade, its bounding box is remembered and its corresponding probability is outputted as a confidence measure therefor; and
   (d) repeat (a-c) for each remaining voxel of each of the nine sub-volumes;
   if bounding boxes exist after each of the nine sub-volumes has been analyzed, the candidate with the bounding box having the highest confidence measure is determined to be a polyp; and
   outputting the image volume with at least one polyp identified therein.

2. The method of claim 1 wherein the probability classifier is an AdaBoost classifier.

3. The method of claim 1 wherein the probability classifier is a Probabilistic Boosting Tree (PBT) classifier.

4. The method of claim 1 wherein the step of applying a probability classifier to the voxel further comprises the steps of:
   applying a plurality of filters to each of the nine sub-volumes.

5. The method of claim 1 wherein the plurality of filters are Haar filters.

6. The method of claim 5 wherein the filters are 3D Haar filters.

7. The method of claim 5 wherein the Haar filters correspond to multiple combinations of different sizes and aspect ratios of templates.

8. The method of claim 5 wherein the Haar filters are computed offline.

9. The method of claim 1 wherein the 3D image volume is a Computed Tomography (CT) image volume.

10. The method of claim 1 wherein the anatomical structure is a colon.

11. The method of claim 1 wherein the anatomical structure is a lung.

12. The method of claim 1 wherein the anatomical structure is a lymph node.

13. A system for determining if candidate locations identified in a three dimensional (3D) image volume of an anatomical structure correspond to a polyp, comprising:
   a memory device for storing a program:
   a processor in communication with the memory device, the processor operative with the program to:
   receive a three dimensional (3D) image volume of an anatomical structure;
   obtain a set of candidate locations in the image volume;
   for each candidate location, crop out three sub-volumes, wherein each sub-volume comprises a different scale and a plurality of voxels;
   for each of the three sub-volumes, obtain two additional sub-volumes (for a total of nine sub-volumes) at different orientations by rotating each sub-volume in two different directions;
   for each of the nine sub-volumes, apply a shape classifier thereto;
   discard voxels of each of the nine sub-volumes that are not identified by the shape classifier as being on a surface of a polyp, and for each voxel of each of the nine sub-volumes that is identified by the shape classifier as being on the surface of a polyp, the processor is further operative with the program to:

(a) compute a gradient direction for the voxel;
(b) if the gradient direction for the voxel falls into one of a plurality of orientations, apply a probability classifier cascade to the voxel;
(c) if the voxel passes the probability classifier cascade, its bounding box is remembered and its corresponding probability is outputted as a confidence measure therefor; and
(d) repeat (a-c) for each remaining voxel of each of the nine sub-volumes;

if bounding boxes exist after each of the nine sub-volumes has been analyzed, the candidate with the bounding box having the highest confidence measure is determined to be a polyp; and output the image volume with at least one polyp identified therein.

14. The method of claim 13 wherein the probability classifier is a Probabilistic Boosting Tree (PBT) classifier.

15. The system of claim 13 wherein the processor is further operative with the program when applying a probability classifier to the voxel to apply a plurality of Haar filters to each of the nine sub-volumes.

16. The method of claim 15 wherein the Haar filters correspond to multiple combinations of different sizes and aspect ratios of templates.

17. The method of claim 15 wherein the Haar filters are computed offline.

18. The method of claim 13 wherein the 3D image volume is a Computed Tomography (CT) image volume.

19. The method of claim 13 wherein the anatomical structure is a colon.

20. The method of claim 13 wherein the anatomical structure is a lung.

21. The method of claim 13 wherein the anatomical structure is a lymph node.

* * * * *